United States Patent
Ahlfeld et al.

[11] Patent Number: 5,437,124
[45] Date of Patent: Aug. 1, 1995

[54] RIGID BACKBONE ENHANCEMENT FOR EXTRUDED PROFILES

[75] Inventors: Michael D. Ahlfeld; David C. Froehlich, both of Maryville, Tenn.

[73] Assignee: Schlegel Corporation, Rochester, N.Y.

[21] Appl. No.: 378,101

[22] Filed: Jan. 26, 1995

Related U.S. Application Data

[63] Continuation of Ser. No. 93,053, Jul. 16, 1993, abandoned.

[51] Int. Cl.⁶ .............................................. E06B 7/16
[52] U.S. Cl. ....................... 49/479.1; 49/490.1; 49/498.1; 49/506
[58] Field of Search .............. 49/479.1, 490.1, 498.1, 49/475.1, 506

[56] References Cited

U.S. PATENT DOCUMENTS

| | | | |
|---|---|---|---|
| 4,542,610 | 9/1985 | Weimar | 49/490.1 |
| 4,701,376 | 10/1987 | Hermann et al. | 49/490.1 X |
| 4,830,898 | 5/1989 | Smith | 49/490.1 X |
| 4,913,976 | 4/1990 | Brooks et al. | |
| 4,923,759 | 5/1990 | Brooks et al. | |
| 5,013,379 | 5/1991 | Brooks et al. | |
| 5,014,464 | 5/1991 | Dupuy et al. | 49/490.1 X |
| 5,095,656 | 3/1992 | Keys | 49/490.1 X |
| 5,123,693 | 6/1992 | Karashima et al. | 49/490.1 X |
| 5,143,772 | 9/1992 | Iwasa | 49/490.1 X |
| 5,147,105 | 9/1992 | Ono et al. | 49/490.1 X |

FOREIGN PATENT DOCUMENTS

| | | |
|---|---|---|
| 2184398 | of 0000 | United Kingdom . |
| 2233377 | of 0000 | United Kingdom . |
| 2272721 | of 0000 | United Kingdom . |

Primary Examiner—Philip C. Kannan
Attorney, Agent, or Firm—Cumpston & Shaw

[57] ABSTRACT

A weatherseal includes a supporting carrier, a body of elastomeric material formed on the carrier, a layer of decorative material disposed on a surface of the body, and a backbone of longitudinally incompressible material disposed between the decorative layer and the carrier for reducing wrinkling of the decorative layer when the weatherstrip is bent on a radius with the decorative layer inside. Another strip disposed adjacent to an irregular carrier eliminates irregularities from the surface of a thin portion of the elastomeric body and improves the appearance of the weatherseal.

13 Claims, 4 Drawing Sheets

RIGID BACKBONE ENHANCEMENT FOR EXTRUDED PROFILES

This is a continuation of application Ser. No. 08/093,053, filed on Jul. 16, 1993, now abandoned.

FIELD OF THE INVENTION

This invention relates generally to weatherstrips and more particularly to weatherstrips for motor vehicles or the like that can be mounted on the inside of relatively tight radius corners without unsightly wrinkling of a decorative layer attached to the weatherstrip.

BACKGROUND OF THE INVENTION

Automobile weatherstrips of the type with which this invention is concerned are commonly formed by extruding a thermosetting elastomer such as EPDM rubber on a supporting carrier such as a woven wire carrier, a stamped metal carrier, a plastic carrier or the like. Preferably a layer of decorative material such as a fabric layer is attached to a portion of the surface of the weatherstrip.

Weatherstrips of the above type exhibit the disadvantage that when mounted on small radius corners with the fabric layer on the inside of the corner, the fabric tends to wrinkle. Known weatherstrips also have a tendency to exhibit another aesthetically degrading characteristic. For cost reasons it is desirable that the EPDM robber body on the supporting carrier be relatively thin to minimize the amount of robber required to make the weatherstrip. If the thickness is low enough, the individual wires of the wire carrier may be visible through the robber body. More accurately, the shapes of wires not the wires themselves are visible. This effect is known in the industry as read through or the "hungry horse effect", and while not impairing the function of the weatherstrip is undesirable from an appearance standpoint.

Weatherstrip in accordance with this invention minimizes or eliminates the wrinkling of a decorative layer positioned at the inside of a small radius corner.

SUMMARY OF THE INVENTION

Briefly stated and in accordance with a presently preferred aspect of the invention, a weatherseal includes a supporting carrier, a body of elastomeric material formed on the carrier, a layer of decorative material disposed on a surface of the body, and a backbone of longitudinally incompressible material disposed between the decorative layer and the carrier for reducing wrinkling of the decorative layer when the weatherstrip is bent on a radius with the decorative layer inside.

Another strip disposed adjacent to an irregular carrier eliminates irregularities from the surface of a thin portion of the elastomeric body and improves the appearance of the weatherseal.

In accordance with another aspect of this invention, the backbone strip is embedded in the body of elastomeric material.

In accordance with yet another aspect of this invention the backbone strip comprises a strip of thermoplastic elastomeric material such as polypropylene.

In accordance with still another aspect of the invention, the backbone strip is an elongated continuous strip having a thickness between about 0.5 mils and 2 mils, preferably about 1 mil.

BRIEF DESCRIPTION OF THE DRAWINGS

The novel aspects of the invention are set forth with particularity in the appended claims. The invention itself, however, along with other objects and advantages thereof may be more fully comprehended by reference to the following detailed description of a presently preferred embodiment of the invention, taken in conjunction with the accompanying drawings in which:

DETAILED DESCRIPTION OF THE PREFERRED EMBODIMENT

Figure 1:
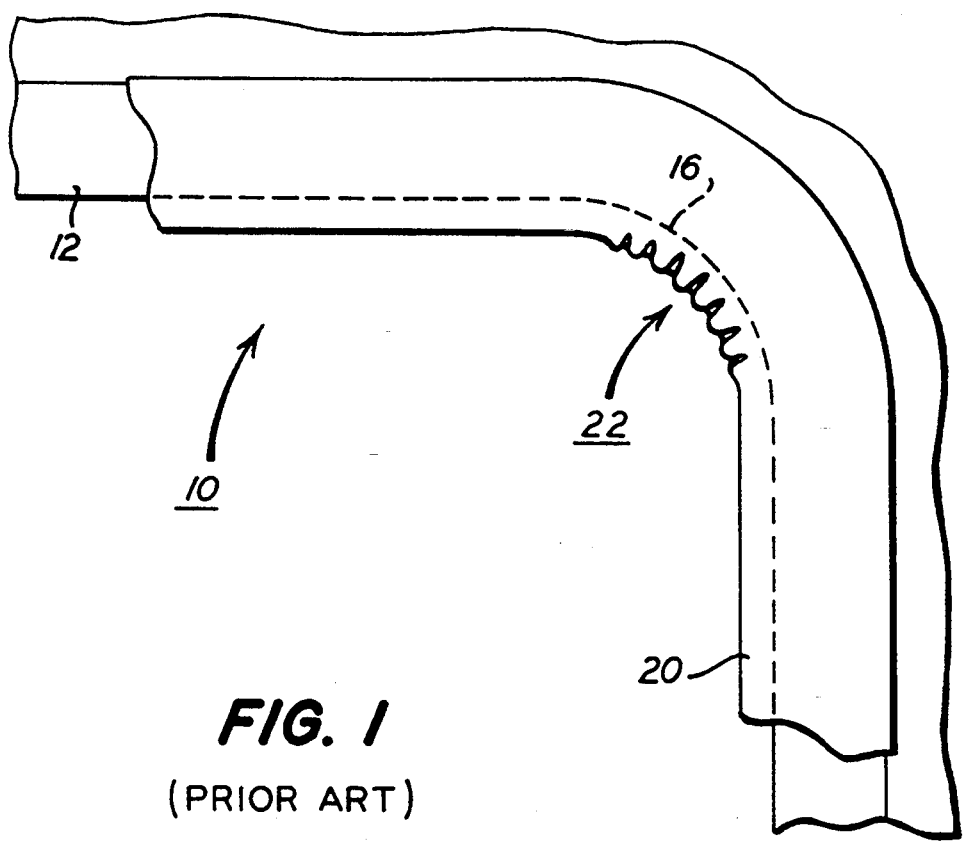
FIG. 1 is a side elevation of weatherstrip in accordance with the prior art showing the wrinkling that occurs in small radius corners.
Figure 3:
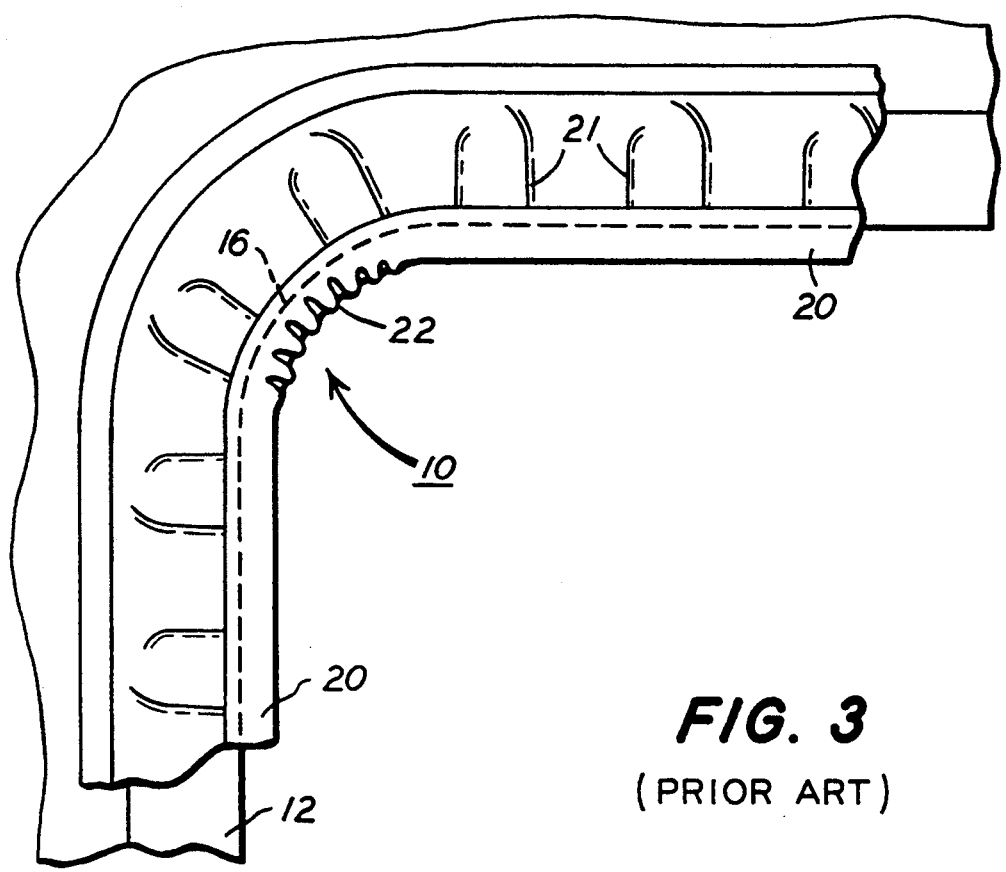
FIG. 3 is a rear side elevation of the prior art weatherseal of FIG. 1 showing the hungry horse effect.

Referring first to FIGS. 1 and 3, a weatherseal in accordance with the prior art indicated generally at 10 is mounted on a flange 12 of a motor vehicle door or window opening or the like. The weatherseal 10 extends substantially around the inside Of the door or window opening, including one or more small radius corners 16. The weatherseal includes an elastomeric body at least a portion of which is covered by a decorative fabric layer 20. Preferably, a supporting carrier, such as a wire carrier, not visible, is embedded in the body for holding the weatherseal on the flange. As can be seen in FIG. 1, the fabric layer mounted on the weatherseal body has a tendency to form wrinkles 22 in the area of the small diameter corner 16, as shown in FIG. 3. When the elastomeric body is thin, a second problem may occur. The serpentine wire carrier may be close enough to the surface of the elastomeric body to be visible as a series of undulations 21. This is referred to as the "hungry horse effect", no doubt because of the resemblance to the ribs of a thin horse. Although the wrinkles and ribs are not functionally significant, they impair the appearance of the weatherstrip, and especially so because they appear in the decorative layer that is visible to the owners of the vehicle.

Figure 2:
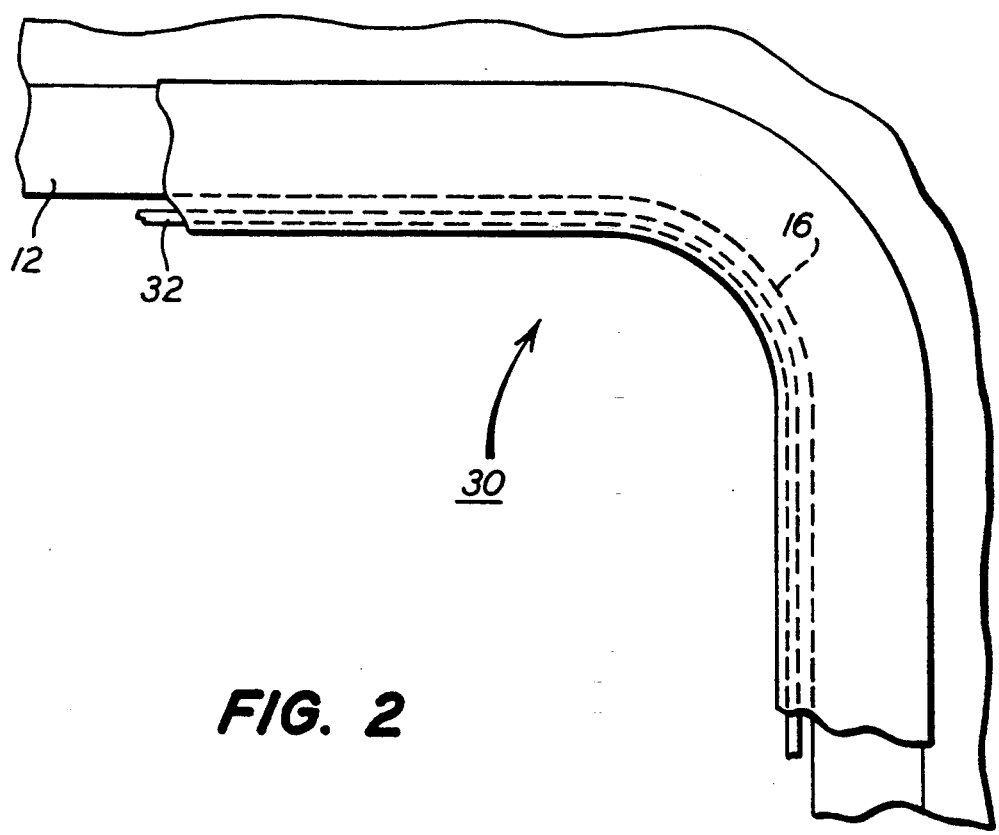
FIG. 2 is a side elevation of a weatherseal in accordance with this invention showing the absence of wrinkles in the corner.
Figure 4:
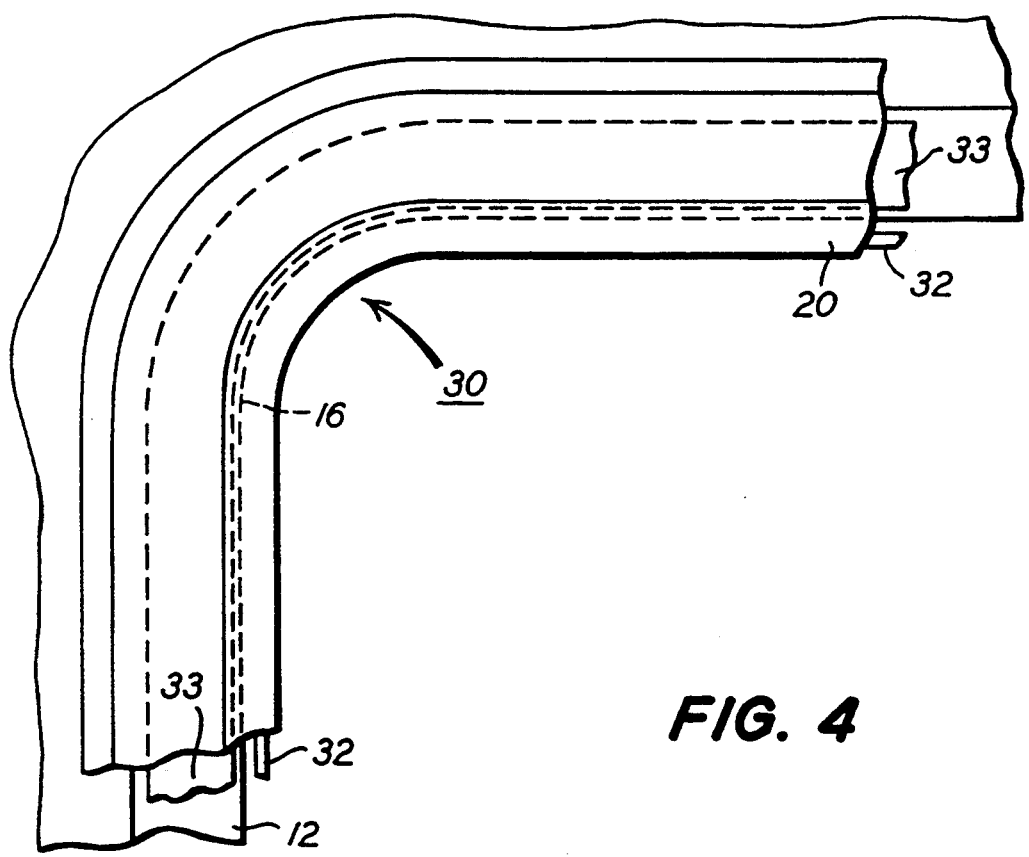
FIG. 4 is a rear side elevation of the weatherseal of FIG. 2 showing the absence of the hungry horse effect.

As shown in FIGS. 2 and 4, a weatherstrip 30 in accordance with this invention substantially eliminates wrinkles at the corners and the "hungry horse effect". The weatherstrip is shown mounted on the same small diameter corner 16 and the absence of wrinkles and ribs is clearly visible. The weatherstrip of this invention achieves the minimization or elimination of wrinkles by providing a backbone strip 32 formed from longitudinally incompressible plastic material or the like beneath the fabric layer to prevent the fabric layer from wrinkling, and a second backbone strip 33 on the side of the weatherstrip to prevent the wire carrier from showing through.

Figure 5:
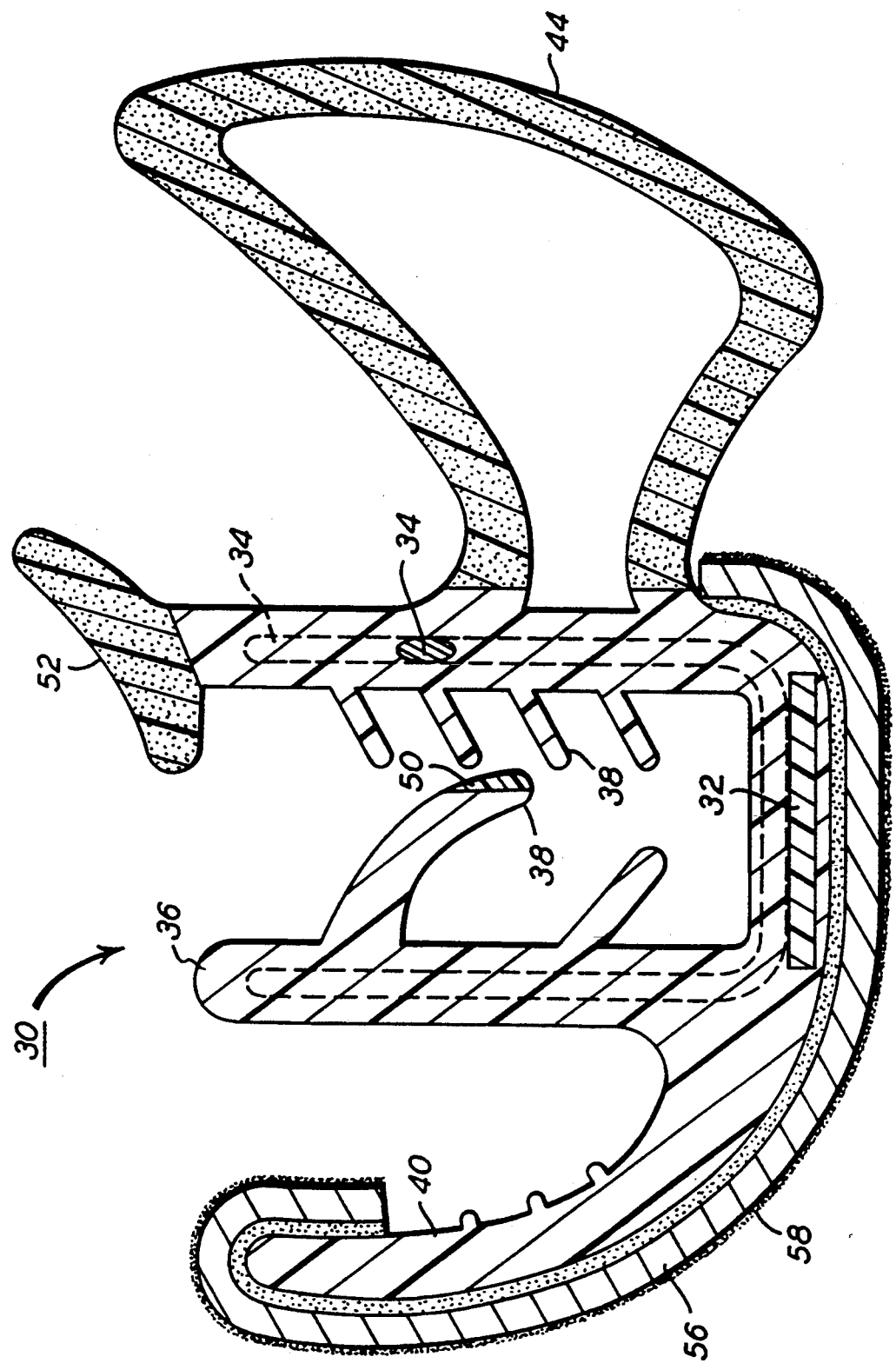
FIG. 5 is a section view of a weatherseal in accordance with this invention.

FIG. 5 shows a cross section of the weatherstrip in accordance with a presently preferred embodiment of the invention. The weatherstrip is formed on a U-shaped carrier 34, such as a wire carrier, stamped metal carrier or plastic carrier. A body 36 of elastomeric material such as EPDM robber or the like is formed on the carrier, preferably by extrusion. While EPDM robber is preferred, the body of the weatherstrip could be made from another elastomeric or thermoplastic material, such as polyvinyl chloride. The weatherstrip body is preferably provided with a number of inwardly extending fins 38 within the U-shaped portion of the body for gripping a mounting flange and securing the weatherstrip thereto. A flange 40 extends from one side of the U in an upward direction generally parallel to one of the legs of the U, while a sealing bulb 44 is attached to the opposite leg of the U. These sealing configurations will vary with the application.

Preferably the sealing bulb is formed from a softer elastomeric material than the body that is coextruded with the body of the weatherstrip. The softer material is preferably also used on the tip 50 of at least one of the inwardly projecting fins 38 for securing the weatherstrip to the flange. Optionally, one or more additional soft elastomeric projections may be provided, such as projection 52. A layer of fabric 56 is attached to the weatherseal and covers the base of the U and the projection 40. The fabric is preferably attached to the elastomeric body by a layer of adhesive 58. A backbone strip 32 of longitudinally incompressible material, such as a plastic material preferably polypropylene, is embedded in the elastomeric body between the fabric layer 56 and the U-shaped carrier 34. Preferably the strip 32 is slightly narrower than the base of the U, and 1.5 mils to 2 mils in thickness, preferably about 1 mil. Other longitudinally incompressible materials such as polycarbonate can be used, but polypropylene is presently preferred.

Figure 6:
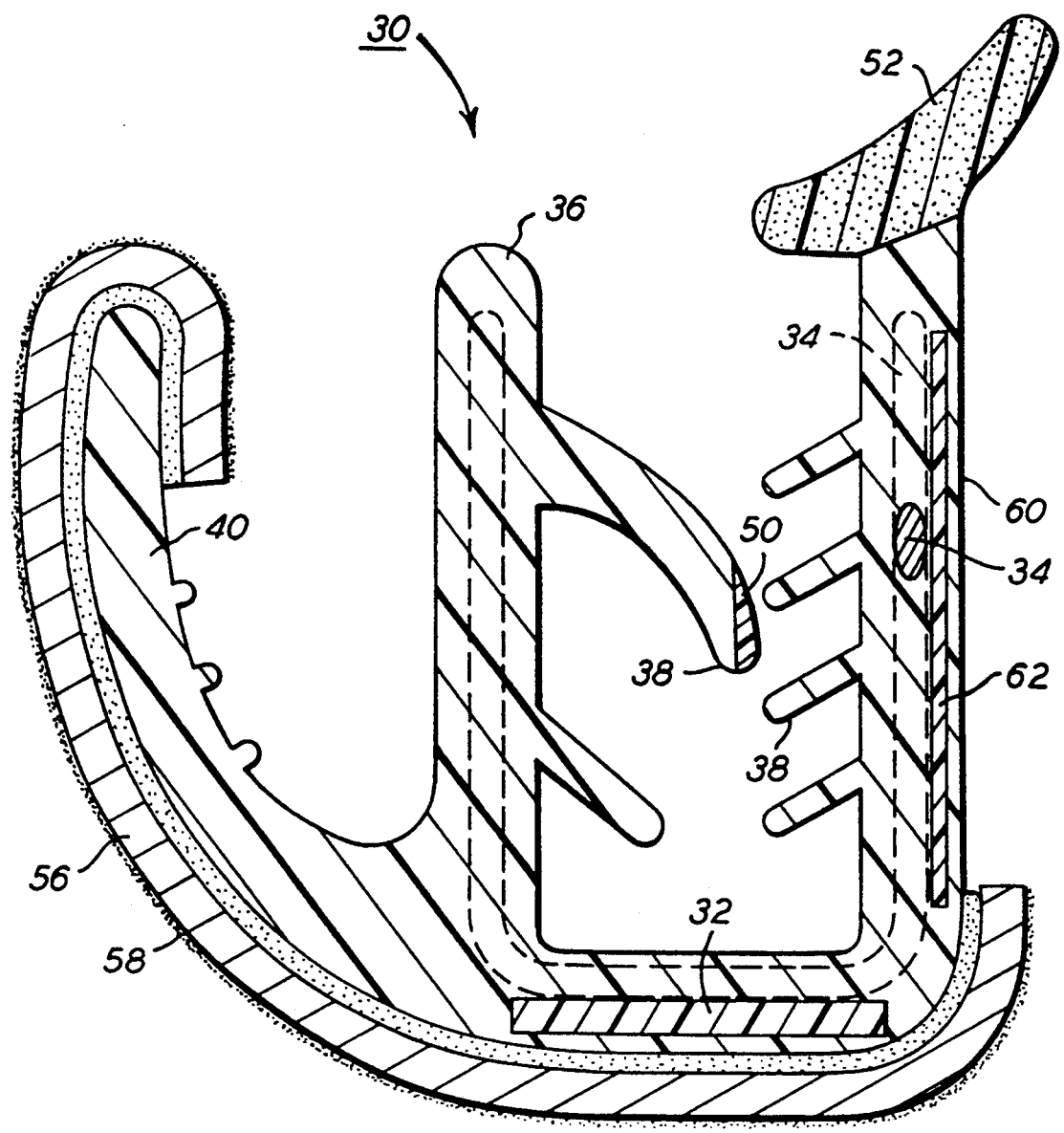
FIG. 6 is a section view of a weatherseal in accordance with another embodiment of this invention.

An embodiment of the invention showing a second backbone strip arranged along the side of the U-shaped body is illustrated in FIG. 6. The figure shows an embodiment similar to FIG. 5 in many respects, and like elements are designated by like reference numbers. Sealing bulb 44 has been omitted and the surface of the elastomeric body is visible at the side surface 60 of the weatherstrip. A second backbone strip 62 of flat material is embedded in the body preferably adjacent to the wire carrier 34. The flat strip is preferably substantially co-extensive with the surface of the wire carrier and extends along the entire length thereof. Depending upon the thickness of the elastomeric body, the flat strip is thinner and substantially wider than the backbone strip 32. The purpose of this strip is slightly different, namely to prevent print-through of the structure of the wire carrier on the surface of the elastomeric body, to eliminate the hungry horse effect. Longitudinal incompressibility would be provided by most materials selected for this strip, but is not essential in accordance with this aspect of the invention.

One method of forming a weatherstrip in accordance with this invention is to introduce the backbone strips 32, and optionally 62 along with the wire carrier into an extrusion die, and extrude the elastomeric body including both the high and low durometer portions thereof around the carrier and backbone strip. The backbone strip 32 is preferably positioned adjacent the base of the wire carrier, but may in fact be embedded in the body anywhere between the fabric layer and the wire carrier. The strip 62 is similarly positioned with respect to the side of the weatherstrip.

While the invention has been described in connection with a presently preferred embodiment thereof, those skilled in the art will recognize that many modifications and changes may be made therein without departing from the true spirit and scope of the invention, which is intended to be defined solely by the appended claims.

What is claimed is:

1. A weatherseal comprising a supporting carrier; a body of elastomeric material formed on the carrier; a layer of decorative material on a surface of the body;
    a backbone strip of longitudinally incompressible material disposed between the decorative layer and the carrier for reducing wrinkling of the decorative layer when the weatherstrip is bent on a radius with the decorative layer inside.

2. The weatherstrip of claim 1 in which the strip comprises a strip of plastic material.

3. The weatherseal of claim 2 in which the strip comprises a strip of thermoplastic material.

4. The weatherstrip of claim 3 in which the thermoplastic material is polypropylene.

5. The weatherstrip of any of claims 2-4 in which the backbone strip has a thickness between about 0.5 mil and 2 mil.

6. The weatherstrip of claim 1 in which the carrier is longitudinally compressible.

7. The weatherstrip of claim 1 in which the carrier is a wire carrier.

8. The weatherstrip of claim 1 in which the carrier is a stamped metal carrier.

9. The weatherseal of claim 1 in which the backbone strip is embedded in the body of elastomeric material.

10. The weatherstrip of claim 1 in which the backbone strip is disposed between the elastomeric material and the carrier.

11. A weatherseal comprising:
    a supporting carrier having an irregular surface;
    a body of elastomeric material formed on the supporting carrier and having a thickness such that the irregular surface of the carrier would be visible on a surface of the body;
    a layer of decorative material on a surface of the body;
    a strip of dimensionally stable material disposed between the carrier and the surface of the body to render the irregular surface of the carrier invisible at the surface of the body; and
    a backbone strip of longitudinally incompressible material disposed between the decorative layer and the carrier for reducing wrinkling of the decorative layer when the weatherstrip is bent on a radius with the decorative layer inside.

12. A method for forming a wrinkle resistant decorative layer on an elongated weatherstrip having an elastomeric body comprising the steps of providing a carrier for the weatherstrip; providing a longitudinally incompressible backbone strip;
    extruding an elongated body of elastomeric material over the U-shaped carrier and the backbone strip with the backbone strip positioned adjacent the base of the U-shaped carrier and applying a decorative layer to the elongated body on the opposite side of the backbone strip from the U-shaped carrier.

13. The method of claim 12 in which the backbone strip is positioned adjacent the base of the carrier.

* * * * *